C. O. THOMPSON.
RESILIENT WHEEL.
APPLICATION FILED OCT. 9, 1913.

1,129,758.

Patented Feb. 23, 1915.
2 SHEETS—SHEET 1.

C. O. THOMPSON.
RESILIENT WHEEL.
APPLICATION FILED OCT. 9, 1913.

1,129,758.

Patented Feb. 23, 1915.
2 SHEETS—SHEET 2.

Witnesses
Wm. H. Mulligan,
Wm. Evalt Jr.

Inventor
Clyde O. Thompson
By Richard Bowen,
his Attorney

UNITED STATES PATENT OFFICE.

CLYDE O. THOMPSON, OF BOONE, IOWA.

RESILIENT WHEEL.

1,129,758.  Specification of Letters Patent.  Patented Feb. 23, 1915.

Application filed October 9, 1913. Serial No. 794,224.

*To all whom it may concern:*

Be it known that I, CLYDE O. THOMPSON, citizen of the United States, residing at Boone, in the county of Boone and State of Iowa, have invented certain new and useful Improvements in Resilient Wheels, of which the following is a specification.

My invention relates to certain new and useful improvements in vehicle wheels, and in its generic nature the invention embodies a wheel of the spring-spoke type, consisting of an improved construction of spoke, rim and hub, and means for coöperatively connecting the three parts in such a manner as to afford an efficient construction of vehicle wheels of the resilient type.

The object of the invention is to provide a simple and durable resilient wheel which will effectively prevent the jar and shock occasioned by road inequalities from being transmitted to the vehicle, so that pneumatic and cushion tires may be dispensed with upon self-propelled and other vehicles.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
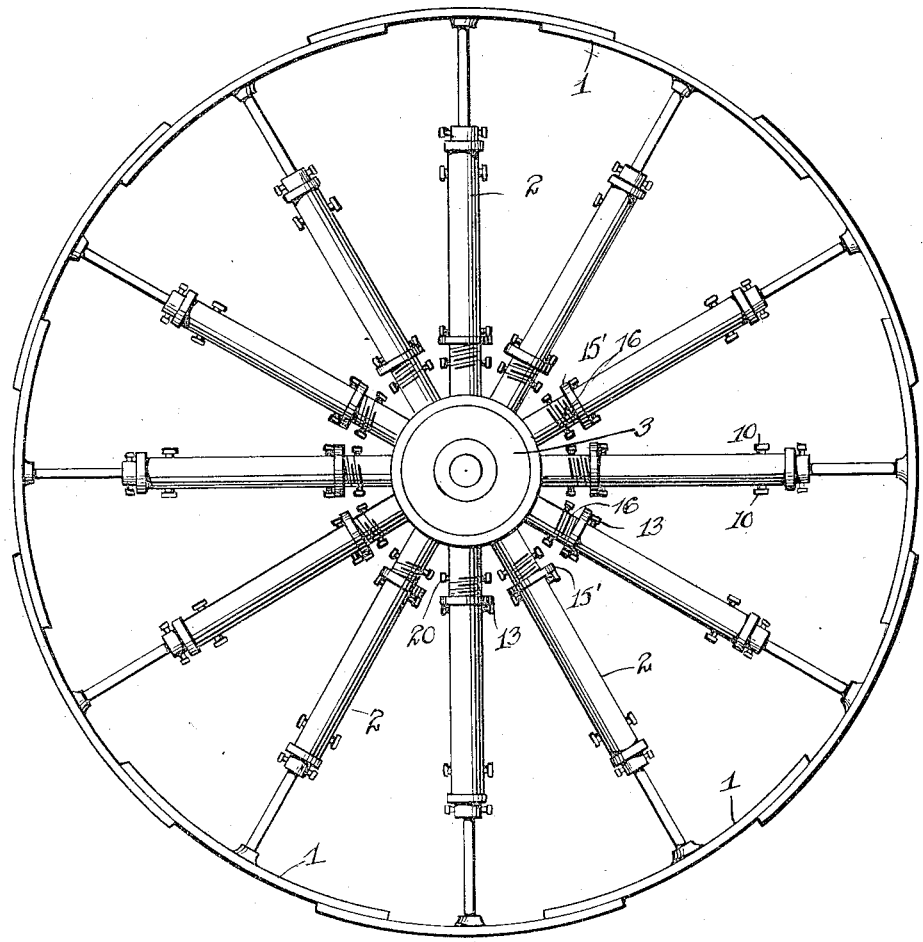
Figure 2:
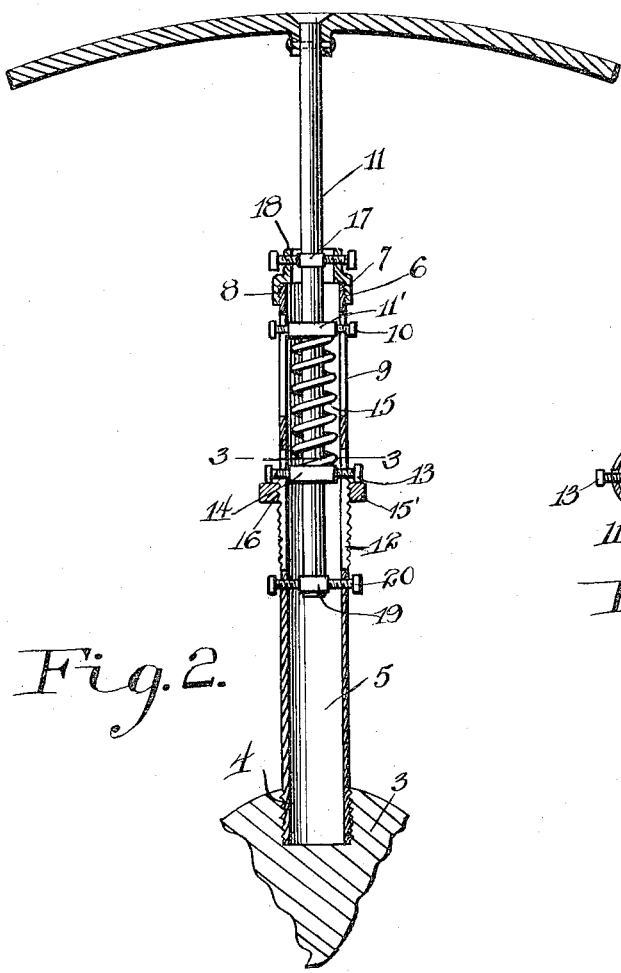
Figure 3:
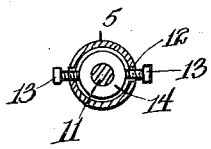

Figure 1 is a side elevation of a resilient wheel constructed in accordance with the present invention; Fig. 2 is an enlarged longitudinal sectional view of one of the spokes; and Fig. 3 is a section on the line 3—3 of Fig. 2.

Referring now to the drawings wherein is illustrated the preferred embodiment of my invention the numeral 1 designates the vehicle felly which is in the present instance composed of a plurality of felly sections, the number of the sections corresponding to the number of spokes designated as an entirety by the numeral 2 radiating from the hub 3 of the vehicle. Screwed or otherwise detachably secured to the hub 3 of the wheel, the latter having a plurality of interiorly threaded recesses 4 formed therein, I provide a tubular member 5, one extremity of which is exteriorly threaded to fit the said recess 4 above mentioned. The construction of the several spokes being the same, the detail structure of but one will be disclosed. The outer end of the tubular member 5 is exteriorly threaded as at 6 for the reception of an interiorly threaded cap or collar 7, the latter having a shoulder 8 formed upon its inner periphery, which shoulder is disposed for engagement with the outer extremity of the said tubular member 5. Diametrically opposite slots 9 are formed within the member 5 at a point adjacent the threaded extremity 6 thereof, through each of which a thumb screw 10 extends, the said screw being adjustably supported and carried by an outwardly directed annular flange 11′ formed integrally with the movable section 11 of the spoke, the inner end of which extends concentrically within the tubular member 5. A second pair of diametrically opposite slots 12 are formed within the tubular member 5 through which thumb screws 13 extend, the said screws being secured to or carried by an adjustable collar 14 arranged to embrace the spoke section 11 at a point adjacent the inner end thereof. Interposed between the flange 11′ and the collar 14, I provide a helical spring 15, the same inclosing that portion of the spoke section 11 between the said flange and the said collar and serving as a cushion support therefor.

As a support means for the collar 14, I provide an adjustable band 15′, the said band being interiorly threaded and arranged to embrace the exteriorly threaded portion 16 of the tubular member 5, the said exteriorly threaded portion extending throughout the length of the slot 12 aforesaid. By the arrangement of the band 15′ and the collar 14, it is apparent that the latter may be adjusted upon the spoke section 11 and supported in such adjusted position by subsequently adjusting the band 15′ until one of the lateral faces thereof is in engagement with the thumb screws 13 projecting oppositely from the said collar.

To centralize the spoke section 11 within the tubular member 5, I provide a ring or band 17, the same being supported through the medium of a pair of set screws 18 in turn supported by the cap 7 of the said tubular member. An additional centralizing means is provided at a point adjacent the face or inner end of the slot 12, the said means comprising a collar 19, likewise supported through the medium of set screws 20 carried by the tubular member 5.

By constructing the felly 1 with a plurality of sections, it will be noted that a new or substitute spoke may be readily applied without in any way altering the structure of the wheel as a whole; that the tension of the spring 15 may be regulated by adjusting the collar 14 against which one end of the said spring abuts, the said collar being adjustable throughout the length of the slot 12 through which the thumb screw 13 carried by the collar projects, and that movement of the spoke section 11 other than in a plane parallel to the tubular member 5 is rendered impossible by the centralizing means embodying the collars 17 and 19 above mentioned.

The overlapping sections of the felly (when a wheel rim is arranged thereover) will cause the weight borne by the wheel to be evenly distributed upon several of the spoke sections; otherwise, the entire weight would be borne by one of the spokes.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A spring wheel including a hub, a plurality of sectional telescopic spokes radiating therefrom, means rigid with one of said spoke sections and engageable with the other of said spoke sections, said means maintaining said sections in axial alinement, a collar adjustable upon the other of said spoke sections, and a spring element inclosed by said last mentioned spoke section and interposed between said centralizing means and said collar, as and for the purpose set forth.

2. A spring wheel including a hub, a plurality of sectional telescopic spokes radiating therefrom, one of the said spoke sections being detachably secured to the said hub, means rigid with said last mentioned spoke section serving as a guide for the other of said spoke sections, centralizing means maintaining said sections with their vertical axes parallel, an abutment adjustable upon the other of the said spoke sections, adjustable means supporting the abutment in its adjusted position, and a spring interposed between said centralizing means and said abutment, as and for the purpose set forth.

3. A spring wheel including a hub, a rim, a tubular spoke section detachably connected to said hub, said spoke section having diametrically opposite slots formed therein, a telescoping spoke section rigid with said rim, means rigid with said tubular spoke section guiding said telescoping spoke section, centralizing means rigid with said telescoping spoke section, said means extending through the diametrically opposite slots aforesaid, a band adjustable upon said tubular spoke section, means within said tubular spoke section supported by said band, and spring means within said tubular spoke section and interposed between said centralizing means and said last mentioned means to effect a cushion support for said telescoping spoke section, as and for the purpose set forth.

4. A spring wheel including a hub, a plurality of detachable tubular members radiating therefrom, a spoke section partially inclosed by each of the said tubular members, a band adjustable upon the said tubular member, a collar supported by the said band through which the said spoke section extends, an annular flange formed integrally with the said spoke section, a felly composed of a plurality of felly sections, one section being secured to each of the said spoke sections, and a spring arranged to embrace the said spoke section, the said spring being interposed between the said collar and the said annular flange to form a yieldable support for the said spoke section, as and for the purpose set forth.

5. A spring wheel including a hub, a plurality of detachable tubular members radiating therefrom, the said tubular members being exteriorly threaded throughout a portion of their length at a point intermediate their ends, the threaded portion of each tubular member being provided with diametrically opposite slots, a spoke section partially inclosed by the said tubular member, a collar arranged within the said tubular member through which the said spoke section extends, a band adjustable upon the threaded portion of the said tubular member, means projecting from the said collar through the said slots and engaging the said band, the latter serving as a support for the said collar, an annular flange formed integrally with the said spoke section, means projecting from the said flange through diametrically opposite slots formed in the said tubular member to form a centralizing means for the said spoke section, a sectional felly, one felly section being secured to each of the said spoke sections, and a spring arranged to embrace the said spoke section, one end of the spring abutting the said flange and the opposite end abutting the said collar to provide a yieldable support for the said spoke section, as and for the purpose set forth.

In testimony whereof I affix my signature in presence of two witnesses.

CLYDE O. THOMPSON.

Witnesses:
GUST. HALEEN,
T. L. ASHFORD.